United States Patent [19]
Freeman et al.

[11] Patent Number: 6,164,581
[45] Date of Patent: *Dec. 26, 2000

[54] LOW NOISE SELF-COMPENSATING VEHICLE SENSOR AND RETRACTOR

[75] Inventors: Michael J. Freeman, Romeo; Ronald A. Heintzelman, St. Clair Shores; Thomas A. DeVilbiss, III, Rochester Hills; Kristopher G. Schaffer, Fraser, all of Mich.

[73] Assignee: Breed Automotive Technology, Inc., Lakeland, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 09/240,741

[22] Filed: Jan. 29, 1999

[51] Int. Cl.[7] .................................................. B60R 22/40
[52] U.S. Cl. .................................... 242/384.4; 242/384.1; 242/384.2; 242/384.5; 297/478; 297/480
[58] Field of Search ................................ 242/384.4, 384, 242/384.1, 384.2, 384.3, 384.5; 297/478, 480

[56] References Cited

U.S. PATENT DOCUMENTS

| | | | |
|---|---|---|---|
| 3,930,622 | 1/1976 | Tanaka et al. | |
| 4,166,592 | 9/1979 | Barcus et al. | |
| 4,341,360 | 7/1982 | Lindblad | 242/384.4 X |
| 4,401,282 | 8/1983 | Miki | 242/384.4 X |
| 4,556,177 | 12/1985 | Kuwakado et al. | 242/384.4 |
| 4,726,540 | 2/1988 | Ches et al. | 242/384.1 |
| 5,480,105 | 1/1996 | Fujimura et al. | 242/384.5 X |
| 5,507,449 | 4/1996 | Kohlndorfer | 242/384.2 X |
| 5,716,102 | 2/1998 | Ray et al. | 242/384.4 X |
| 5,882,084 | 3/1999 | Verellen et al. | 242/384.4 X |

FOREIGN PATENT DOCUMENTS

| | | |
|---|---|---|
| 0795447 | 9/1997 | European Pat. Off. . |
| 4128775 | 3/1992 | Germany . |
| 10-157568 | 6/1998 | Japan . |

*Primary Examiner*—Donald P. Walsh
*Assistant Examiner*—Emmanuel M. Marcelo
*Attorney, Agent, or Firm*—Markell Seitzman

[57] ABSTRACT

A seat belt retractor (22) having an inertial sensor to initiate lockup of the retractor, the inertial sensor including a first housing portion (102) having an actuating arm mounting member (120). The retractor including a first pin (126) cantilevered from the mounting member (120); an activation arm (130) rotationally supported upon the first pin (126), the activation arm (130), when activated, movable into engagement with a ratchet wheel (80), a pendulous vehicle sensor subassembly (150) mounted upon the first housing portion (102), the subassembly (150) and the first housing portion (102) including a support mechanism to rotatably support the sensor subassembly thereon. The sensor subassembly (150) further including a weighted member (152) having a platform for supporting a movable inertial weight (154), the inertial weight movable on the platform in response to deceleration to which the retractor is subjected; a movable arm (156) supported by the weighted member and including a sensing arm (240) having a tip (202) resting upon the inertial weight (154), the movable arm cantilever supported relative to the weighted member, wherein movement of the movable arm causes movement of the sensing arm thereby causing a change in the elevation of the activation arm thereby placing the retractor in a pre-lock mode.

11 Claims, 14 Drawing Sheets

Fig. 8b

LOW NOISE SELF-COMPENSATING VEHICLE SENSOR AND RETRACTOR

BACKGROUND AND SUMMARY OF THE INVENTION

The present invention generally relates to seat belt retractors and inertial sensors used therein.

A typical seat belt retractor is designed to be installed within a vehicle at a fixed position such as on the B-pillar or attached to a non-rotatable portion of the seat frame. In this type of application, the vehicle sensor, that is, the inertial sensor which responds to changes in vehicle deceleration (acceleration or rollover events), is supported relative to the retractor frame such that its corresponding inertial mass is at a nominal, typically vertical position (aligned to the local gravity vector). The conventional vehicle sensor includes a housing having a support surface, a weight (such as a standing man, pendulum, ball or weighted member with a lower spherical surface) and an actuator lever. The weight moves upon the support surface and as it does, changes its elevation thus engaging the actuator lever, and pushing the lever into engagement with another retractor part, typically the teeth of a ratchet wheel. The housing is usually permanently attached to a frame of the retractor. The lever is pivoted at one end, the pivot end, by the sensor housing. This simple type of construction cannot be applied to a retractor that is mounted within the seat back of the automotive seat unless provision is made to maintain the verticality of the support structure, such as the sensor housing, and the inertial mass as a function of the angle of the seat back. As can be appreciated, in the conventional vehicle sensor which is secured to the retractor frame, if the retractor is tipped, for example as the seat belt is moved, the vehicle sensor will be moved to a non-working or performance reducing orientation.

Figure 1A:
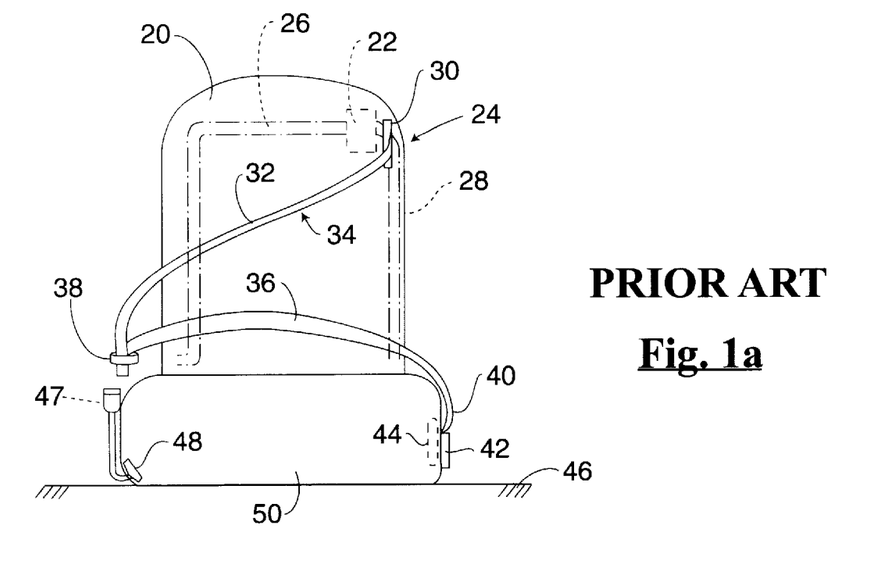
FIGS. 1a and 1b illustrate a prior art SIB safety restraint system.
Figure 1B:
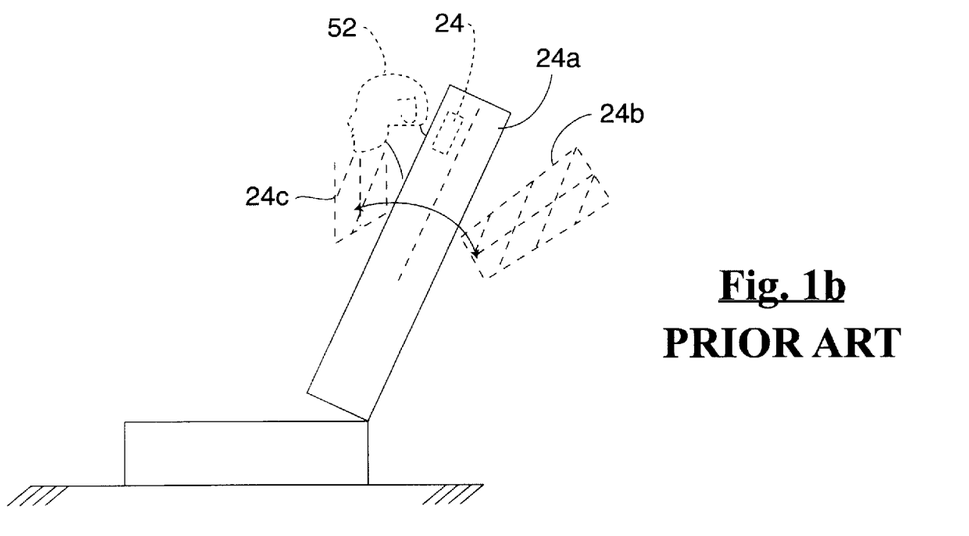

Reference is briefly made to FIGS. 1a and 1b which illustrate a prior art three-point, seat-integrated-belt (SIB) safety restraint system.

The three-point SIB system 20 of FIG. 1a includes a retractor 22 secured to the vehicle seat generally shown as 24. More particularly, the retractor 22 is secured to the frame 26. This frame or frame part 26 is located within the seat back 28. The seat 24 may also include an exit opening 30 through which the shoulder belt 32 of a seat belt 34 exits. The other end of the shoulder belt is wound about a spool (not shown) of the retractor 22 in a conventional manner. The seat belt 34 is separated into the shoulder belt portion 32 and a lap belt portion 36 at the juncture of a tongue 38 also in a known manner. The opposing end 40 of the lap belt is secured via an anchor 42 (or a lap retractor) to a frame portion such as 44 of the seat 24 or to the vehicle floor 46. The tongue 38 is insertable within a buckle 47 which is appropriately secured at via anchor 48 to the seat 24 or to the floor 46. The seat 24 additionally includes a seat cushion 50. The seat back 24 is typically movable through a range of positions, from a nominal position designated as 24a (in FIG. 1b) to a reclined position 24b or to a forward position 24c. It should be appreciated that the positions 24b and 24c are merely illustrative and that the angular movement of the seat back may be larger or smaller than the extremes shown. In certain situations it may be desirable to ensure that the seat belt retractor is in a pre-lock condition such as when the seat back is in a near-vertical orientation, about 3.5° (forward rotation) to −8.5° (rearward rotation), such as illustrated in position 24c, or when the seat back has been reclined, such as in position 24b, to an orientation that is between 25° and 45° or more. By pre-locked it is meant that the various elements of the retractor sensing system have been moved into an orientation such that if the seat belt is then protracted from the retractor, the retractor will be placed into a locked condition, as the seat belt is protracted, regardless of the speed of seat belt protraction or level of vehicle deceleration.

In an SIB environment the retractor 22 will be placed much closer to the occupant's head 52 than if the retractor were located behind trim at the base of the B or C pillars of the vehicle. This positioning has been exaggerated in FIG. 1b. As such, any contact or vibrationally induced sounds (typically referred to as buzz, rattle and squeak in the automobile industry) need to be minimized, as there might not be sufficient attenuation by the seat structure, trim or foam cushion. Depending on actual road conditions, the vehicle may be subjected to inertial inputs in excess of 0.7 g which emphasizes the need for noise attenuation in all vehicle components.

It is an object of the present invention to provide a seat belt retractor that is characterized by quiet operation. A further object of the present invention is to provide the seat belt retractor that is operable in a plurality of rotated seat back orientations. A further object of the present invention is to provide a seat belt retractor that is mounted within a seat back, and which is placed in a pre-locked condition when the seat back is oriented in one or more lock zones defined by extremes of seat back rotation.

Accordingly the invention comprises a seat belt retractor having a noise reducing self-compensating inertial sensor. The sensor is usable in a variety of sensor housing configurations or assemblies (such as fixed or self-compensating). One of these sensor housing assemblies includes a cantilevered support pin with a rotational actuator lever mounted thereupon. The pin and actuator lever configuration can be used in a simple fixed sensor housing or in more complicated self-compensating sensor assemblies as illustrated below in which a plurality of pins and levers are employed. A variety of inertial weights (or sensor masses) may be used with the improved multi-pin and multi-lever configuration of the present invention. The inertial sensor includes a weight having a metallic body insert molded with an elastomeric material to reduce contact noise with a cooperating sensor lever contacting the top of an elastomer-filled portion of the sensor mass (weight). The sensor further includes an elastomer layer at its base to reduce noise between the sensor mass and a support surface (provided by the sensor housing).

Many other objects and purposes of the invention will be clear from the following detailed description of the drawings.

DETAILED DESCRIPTION OF THE DRAWINGS

Figure 2:
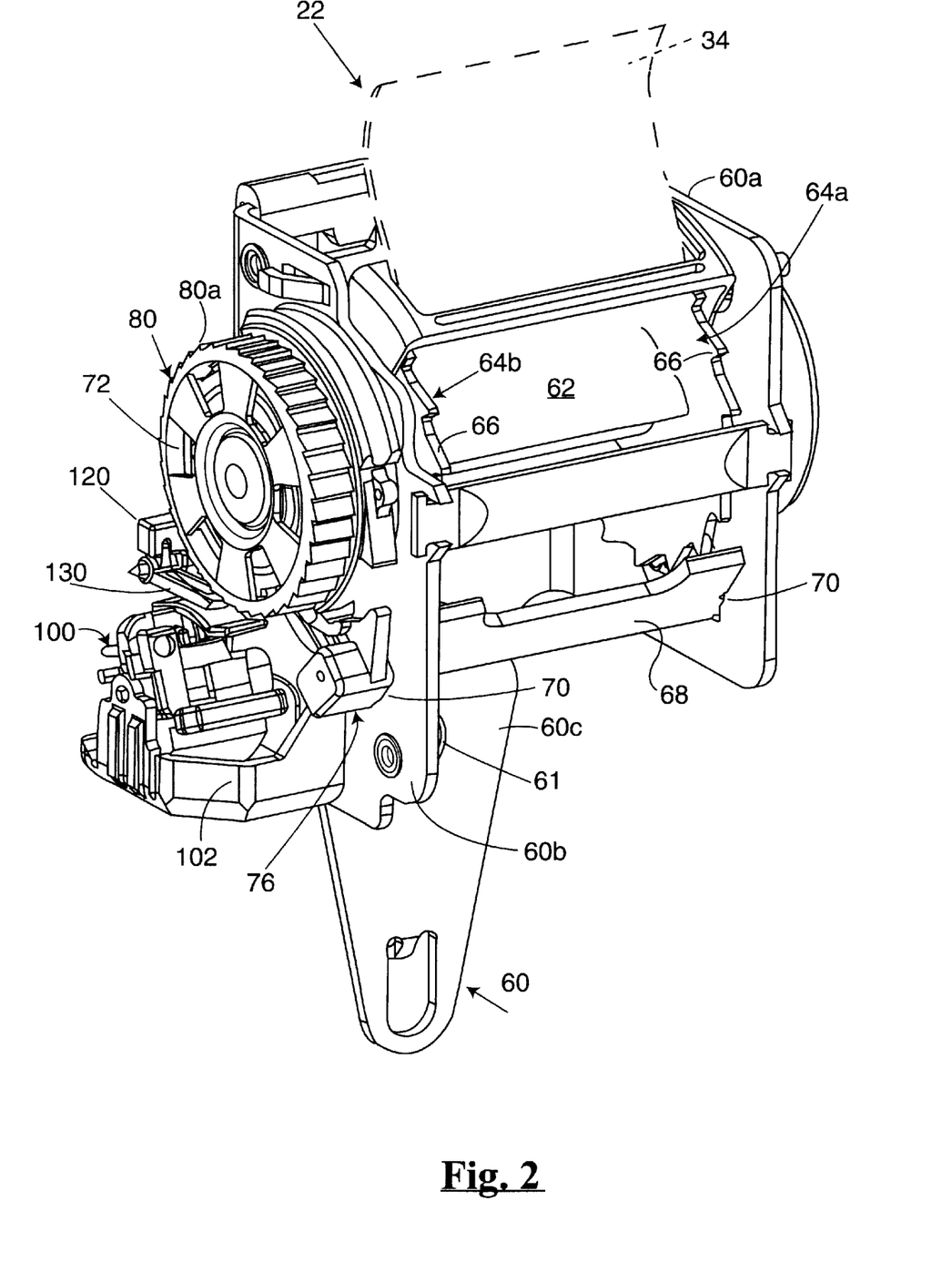
FIG. 2 diagrammatically illustrates a seat belt retractor that uses the sensor of the present invention.

FIG. 2 illustrates a seat belt retractor 22 that is operable with the vehicle sensor or sensor assembly 100 of the present invention. The retractor 22 is a conventional retractor comprising a three-sided frame 60 having sides 60a and 60b and a rear (side) 60c. The sides or the rear can include a mounting hole 61 for mounting the retractor 22 to the frame 26 of the seat 24 or other vehicle structure. The retractor 22 includes a spool 62, which is rotationally mounted on the frame. A length of seat belt 34 (shown in phantom line) is wound on the spool and is rewound by a rewind spring in a known manner. The spool may include or have operatively attached thereto one or more lock wheels 64a and/or 64b. Each of the lock wheels has a plurality of locking teeth 66. The spool is selectively locked by operation of a locking pawl 68 that is rotationally mounted to the frame such as within openings 70 in one or both sides 60a and 60b. As illustrated, the retractor 22 is referred to as a dual-sided locking retractor since the locking pawl 68 engages the lock teeth of each lock wheel. It is similarly conventional to use only one locking wheel such as 64b which is engaged by a pawl 68 pivotally mounted to one side of the retractor 22. Retractors such as 22 further include a means for bringing the locking pawl 68 into engagement with the lock teeth 66 during an emergency or other defined event. There are various ways of accomplishing this function. One means is to include, within the retractor, a rotatable lock cup or ring 76, a web sensor 72 and some type of vehicle sensor such as vehicle sensor 100. The lock ring 76 is initially uncoupled from the spool 62 or axle part that may extend from and rotate with the spool. The lock ring 76 is biased in a direction to maintain the lock pawl away from the lock teeth, typically by a spring which is not shown. Activation of the web sensor or the vehicle sensor couples the lock cup or ring to the spool which (as the seat belt is pulled out) causes the lock ring to rotate. This rotation moves the lock pawl 68 into locking engagement with the teeth of the lock wheel(s). As is known in the art, there are many sensor configurations that will accomplish the above functions. As illustrated the exemplary web sensor 72 may include an inertial weight or disk that can be configured to also function as a ratchet wheel 80 which is also loosely secured to the spool 62 or extending axle part. When the shoulder belt is rapidly pulled from the retractor 22, the ratchet wheel 80 will momentarily lag behind the motion of the spool or shaft. This relative motion is used to move a web sensor tooth member (not shown) into engagement with internal teeth of the lock ring 76 thereby coupling the spool to the lock ring. As is known in the art, the relative motion between the ratchet wheel 80 and the spool 62 can also be created such as by stopping the motion of the ratchet wheel 80 (which as mentioned is loosely coupled to the spool 62 or axle part) to generate the needed relative motion. The ratchet wheel 80 may be halted by intervention of a sensor pawl or activation arm such as 130 as discussed below. One such web sensor and lock cup is shown in U.S. Pat. No. 4,564,154 which is incorporated herein by reference.

Figure 3:
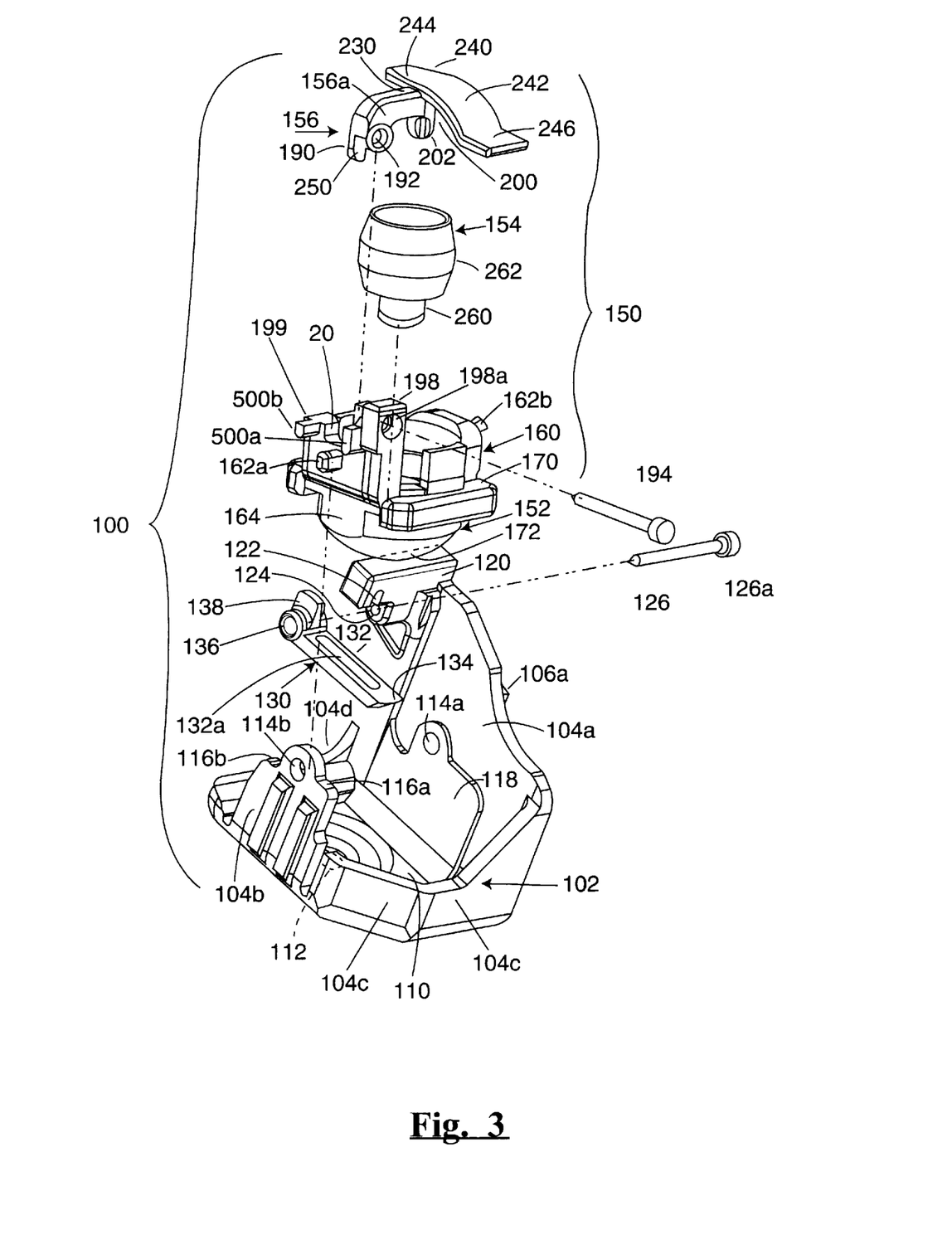
FIG. 3 is an exploded view of a vehicle sensor.
Figure 3A:
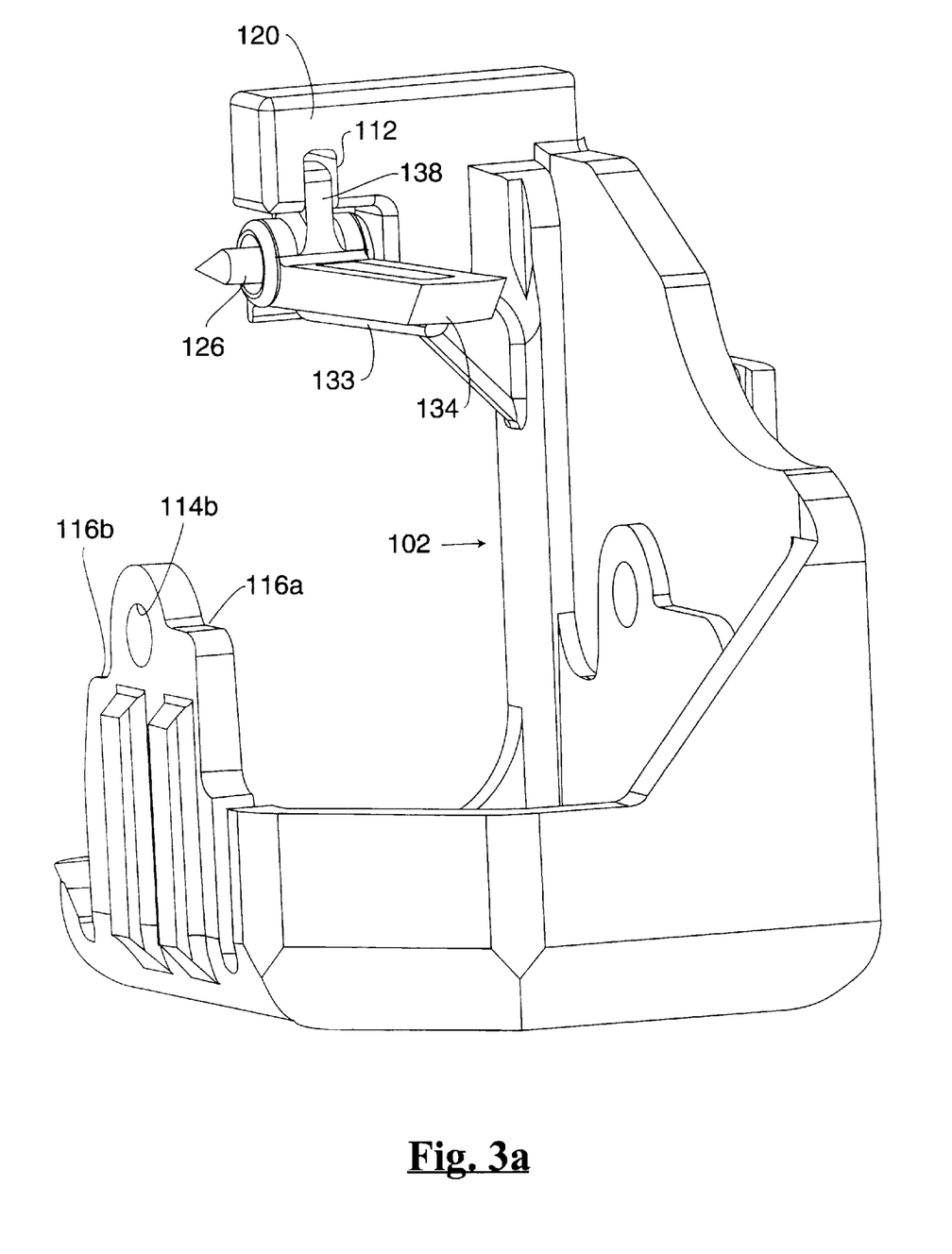
FIG. 3a illustrates a housing portion of the vehicle sensor of FIG. 3.
Figure 4:
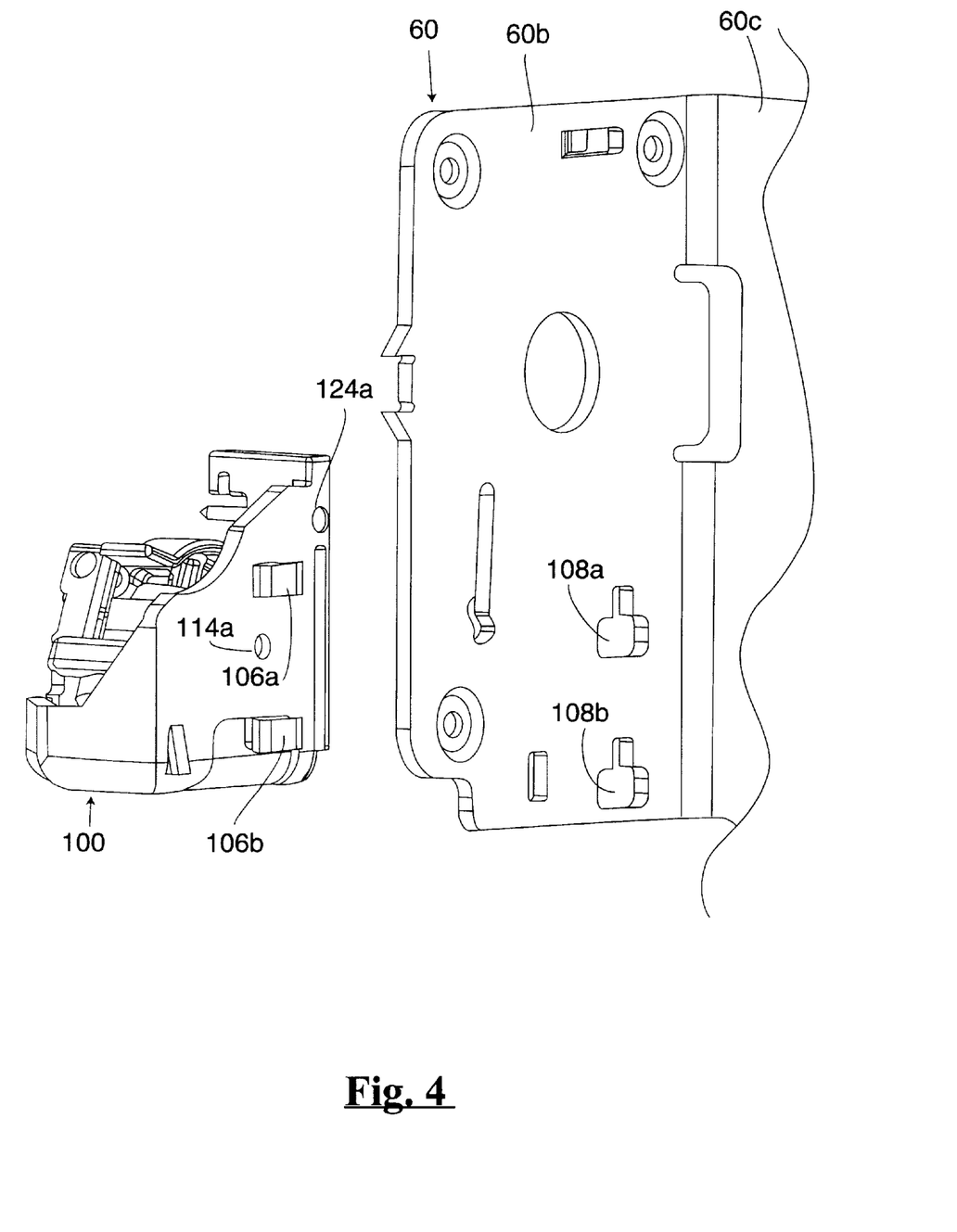
FIG. 4 is an isometric view showing mounting features of a sensor housing and a portion of a retractor frame into which the mounting features fit.

Reference is again made to FIG. 2 as well as to FIGS. 3 and 3a. The vehicle sensor 100 comprises a first sensor housing 102 that is attached to a frame side such as 60b. The main purpose of this housing is to provide a pivot for a vehicle sensor subassembly 150 so that the vehicle sensor weight can remain inertially fixed as the seat and retractor are moved. The housing 102 can be made from a thermoplastic, typically an impact modified or conventional acetal. The housing 102 includes a first wall or side 104a and a second and opposing wall or side 104b. Wall 104a includes two mounting features 106a and 106b (see FIG. 4) which are received within openings 108a and 108b (see FIG. 4) in side 60b of the frame 60. The housing 102 further includes a bottom 110 having a drainage hole 112 therein. Each of the sides 104a and 104b includes an opening or bushing 114a and 114b which functions as the pivot for the subassembly 150. The side 104a is formed having two shoulders 116a and 116b which act as mechanical stops for cooperating parts such as projections or pins 500a and 500b of the subassembly 150 (which move relative to the stops as the seat back 28 is moved rearward or forward from its nominal position). More specifically, the vehicle sensor subassembly 150 further includes a plurality of extending pins 500a and 500b. As can be appreciated, as the seat back 24 is rotated to its extremes, one or the other pin 500a or 500b will respectively engage one of the shoulders 116a and 116b thereby preventing further relative rotation of the subassembly 150.

The interior face of 104a includes an upraised surface profile shown as 118. The purpose of this upraised portion 118 is to maintain a predetermined thickness of wall 104a for pivot pin opening 114a providing adequate cross-sectional strength. The housing 102 additionally includes sides 104c and 104d which are provided to increase the strength of the housing. Further, the forward corner shown as 104e is optionally chamfered, which permits the sensor 100 to fit within a restricted packaging profile.

The housing 102 also includes an inwardly extending pivot or support arm or mounting member 120. Member 120 extends perpendicularly from a top portion of wall 104a and includes a keyway or slot 122, which minimizes lateral movement of an actuator arm 130, and a through-passage or bore 124 arranged perpendicular to the keyway or slot 122. A first pin 126, typically fabricated of stainless steel or plated steel to provide a low-friction, low-noise surface, is inserted within bore 124. The pin 126 can be coated with a thermoplastic or thermosetting elastomeric material. The pin 126 can be inserted into the mounting member 120 during the assembly of the sensor 100 or, alternatively, insert molded and formed as part of the mounting member 120. The pin 126 includes an enlarged end 126a that is received within a complementary-sized portion 124a of bore 124 (shown in FIG. 4). Rotatably situated on the pin 126, and key-locked with the sensor housing member, is the activating (actuator) arm or sensor pawl 130. The arm 130 includes a lever portion 132 having a tooth 134 formed thereon. A thin lower rib 133, see FIG. 3a, is formed on the bottom of the arm 130. The lower rib 133 can be of the same material as the rest of the arm 130 or made from an elastomer such as used with weight 154 as detailed below. The lever portion 132 can be of a solid cross-section or of a generally hollow cross-section, the hollow shown as numeral 132a. The lever can be made from a thermoplastic such as acetal. The hollow 132a can be filled with a thermosettting or thermoplastic elastomer to further reduce impact noise. The tooth 134 is moved into engagement with one of the teeth 80a of the ratchet wheel 80 (see FIG. 2) to initiate the lock-up of the retractor 22. The arm 130 includes a bore 136 that is loosely received about the pin 126 which acts as a pivot for the arm 130. The arm 130 further includes a key 138 which is received within slot or keyway 122. The keyway 122 is slightly oversized relative to the size of the key 138. The walls of the slot 122 prevent the arm 130 from sliding off of the pin 126. As can be appreciated from FIG. 2, the pin 126 is cantilever mounted to the mounting member 120 and the activation arm or sensor pawl 130 is pivoted thereabout. This mounting relationship is in contrast to supporting the arm 130 or the pin 126 on two opposing posts as was done in the prior art. The mounting relationship of the present invention has the following benefits: low noise due to the use of a single cantilevered pin location, reduced friction (which leads to increased sensor sensitivity) at the pivot occasioned by the use of dissimilar material such as the steel pin and the plastic arm(s), increase in the natural frequency due to the choice of material (primarily the steel pin) reducing noise, and the cantilever construction permits tighter control of dimensions and tolerances further reducing noise. Additionally, this construction alleviates stressing of the sensor housing pivot walls during the insertion of the actuator arm 130.

During assembly of the activation arm 130 to the pin 126, the arm 130 is rotated downwardly 90 degrees (from its position shown in FIGS. 2 or 3) so that the key 138 extends perpendicularly inward (to the right) relative to member 120, positioned in slot 122, and the arm 130 is slid upon pin 126 (or vice versa). Thereafter, the arm 130 is rotated to its orientation shown in FIGS. 2 or 3 to permit the attachment of the vehicle sensor subassembly generally shown as 150.

Figure 5:
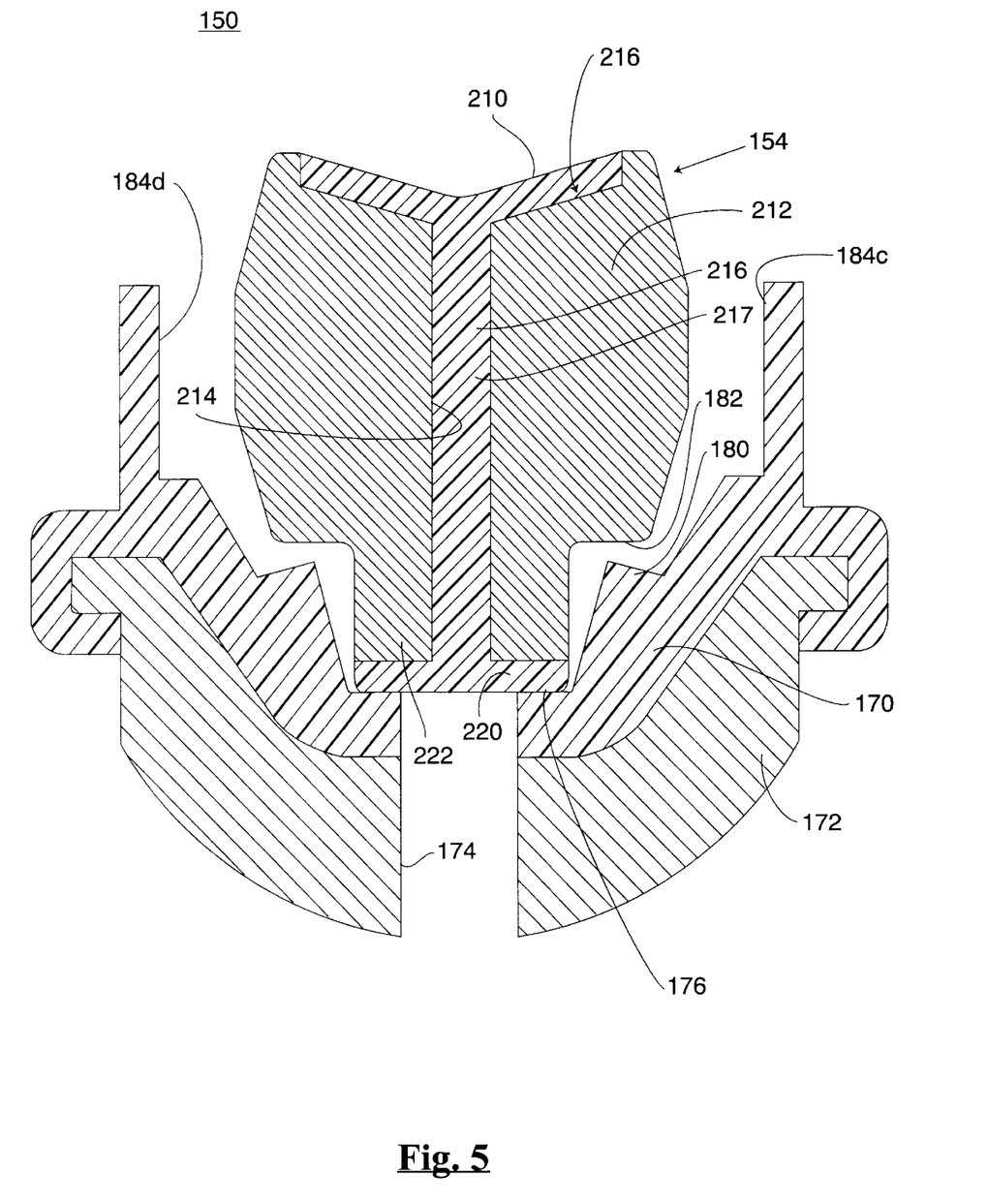
FIG. 5 is a cross-sectional view of the sensor case subassembly.
Figure 5A:
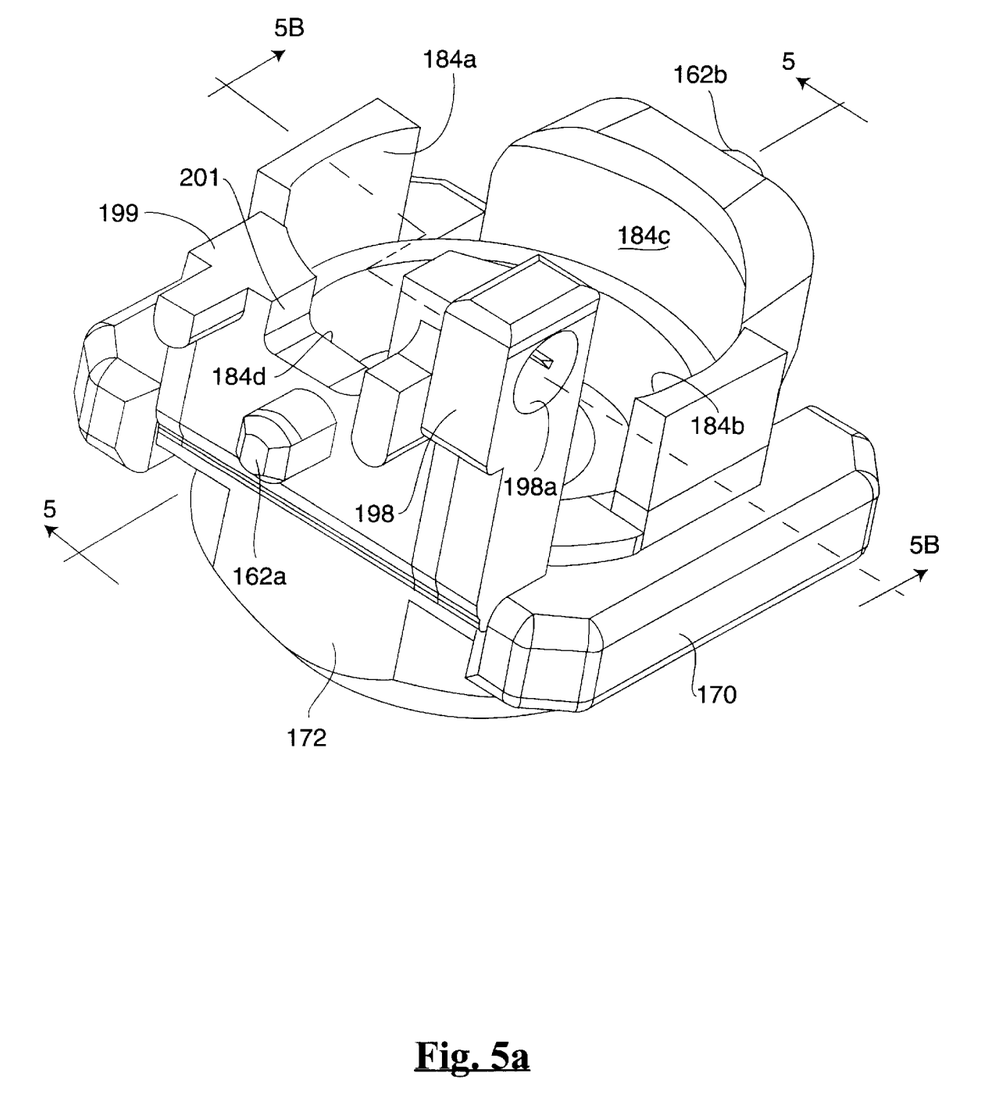
FIG. 5a is an isolated view of a counterweight member of the sensor case subassembly.
Figure 5B:
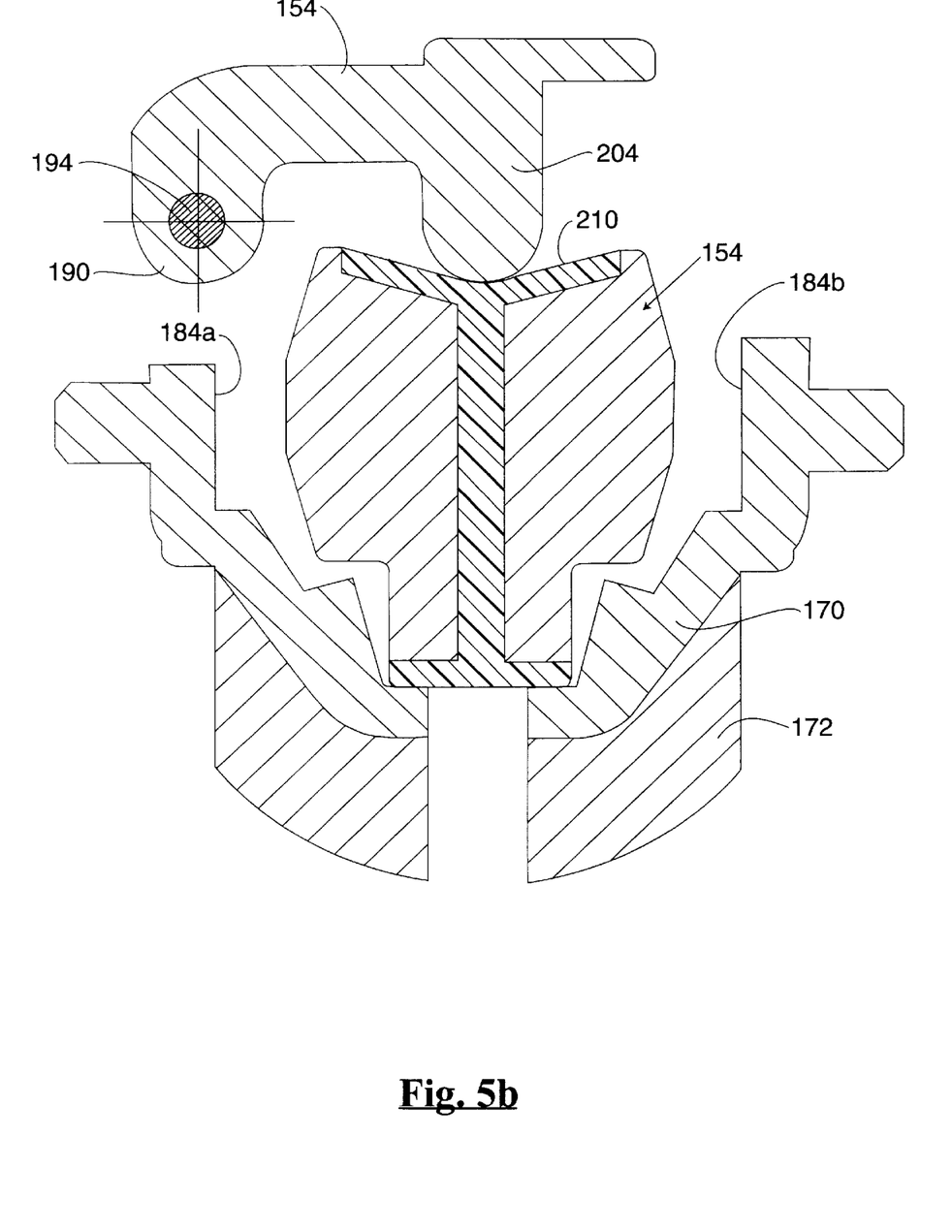
FIG. 5b is another cross-sectional view of the sensor case subassembly.

The activation arm 130 is moved into its active position by interaction with a vehicle sensor subassembly 150. The subassembly 150 includes a counterweight member 152 and inertia weight or mass 154 such as standing man and a sensor pawl 156. The counterweight member 152, which supports the weight 154 and sensor pawl 156, is pivotally supported in the first housing 102 and acts as a pendulum to maintain the orientation of the weight 154 to its preferred vertical orientation (as the seat back position is varied) so that the weight 154 can properly respond to vehicle deceleration. The counterweight member 152 comprises a pivoted support or housing 160 in which is received the weight 154. The member 152 or alternatively housing 160 includes integrally formed pins, stub axles or pivots 162a and 162b that are rotationally received within openings 114a and 114b of the housing portion 102. The housing may be made from any thermoplastic such as, for example, a glass-filled polypropylene or acetal. The counterweight member 152 is fabricated such that its center of gravity (cg) illustrated by numeral 164 (as well as the center of gravity of the entire vehicle sensor subassembly 150) is situated below the axles 162a and 162b. The member 152 may be fabricated as a unitary, typically cast part such as from a lead or zinc casting or fabricated, as shown, utilizing a two-part housing 160 including an impact, noise absorbing plastic platform 170 secured to a metal weight 172 positioned below the platform 170. If the counterweight member 152 is formed as a unitary part, it would also include a platform 170 to support the inertia weight 154. The counterweight member 152 also includes a drainage hole 174 (see FIG. 5) that extends therethrough (also through the platform 170 and weight 172). The contoured platform 170 (as shown in FIGS. 5, 5a and 5b) comprises a flat, circular, center portion 176 upon which the weight (such as a standing man 154) sits. The platform 170 further includes an annular rim 180 situated below a ledge or shoulder 182 of the weight 154 and a plurality of walled surfaces 184a–d (see FIGS. 5, 5a and 5b) which constrain the standing man 154 from tipping over too much.

Figure 5C:
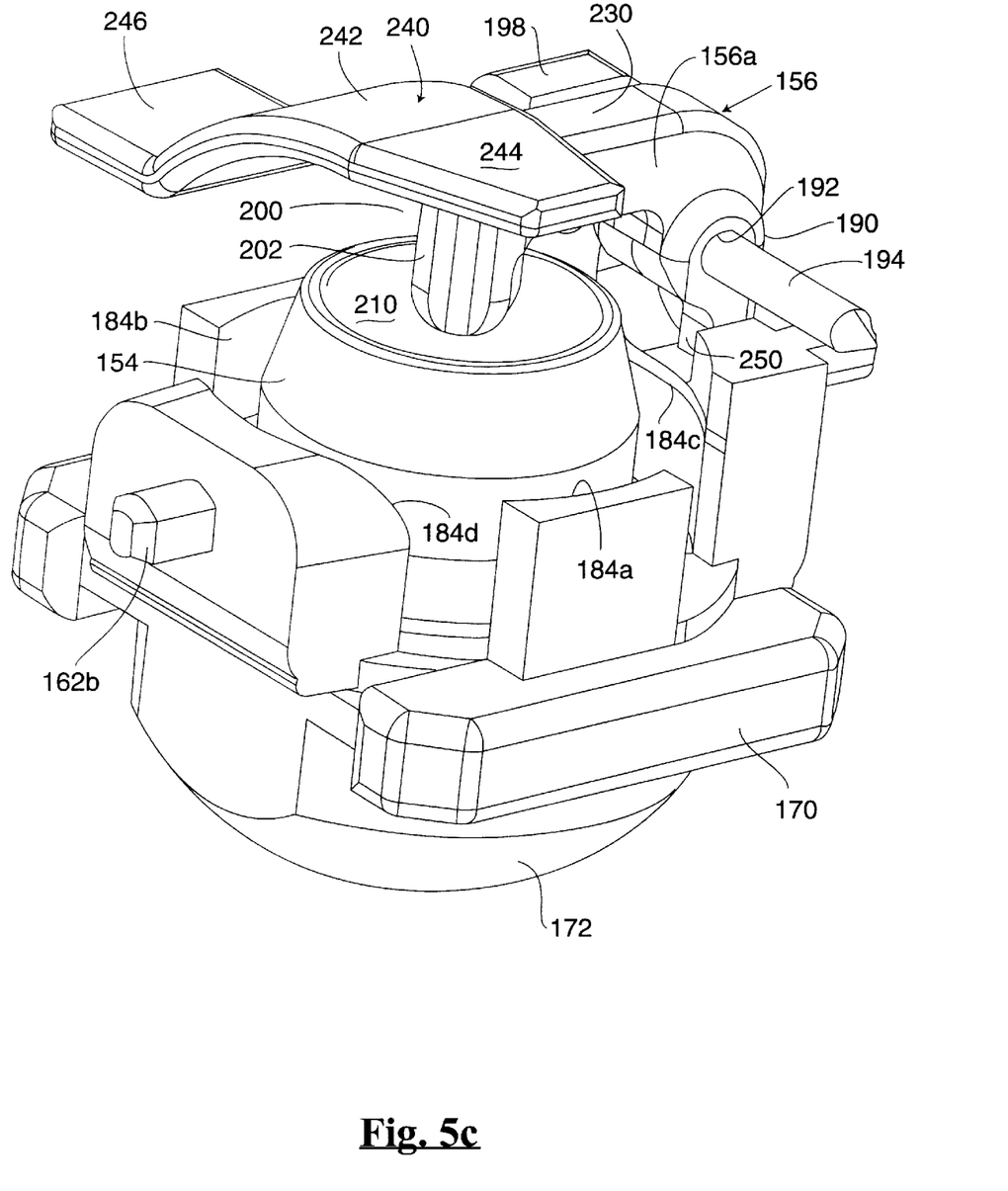
FIG. 5c shows an assembled self-compensating sensor or sensor assembly.

The housing 160 includes an upright post 198 having an opening 198a therein and a second foreshortened post 199 spaced from post 198. The spacing is shown as numeral 201. A second pin 194 is cantilever mounted to the post 198 and is inserted through the opening 198a and the arm 156 is rotationally supported thereon. The pin 126 can be coated with a thermoset or thermoplastic elastomer. The pin 194 may also be formed (such as by molding) as an integral portion of the post 198. The arm 156, of the subassembly 150, includes a first end 190 that is pivoted on the second pin 194 (which can also be seen in FIG. 5c). The first end also includes an extending key 250 that fits within space 201 and reacts with post 199 to prevent the arm 156 from sliding off of the pin 194. The arm 156 additionally has an opening 192 therein to receive the second pin 194. The arm 156 includes a second end 200. Extending from a lower surface of the second end 200 is a projection 202. The projection 202 has an arcuate, hemispherical, smooth tip 204 which rides upon top 210 of the weight 154. The top 210 of the weight 154 is conically shaped to provide lift activation of the lever 156.

Secured to the top portion 230 of the second end 200 of the lever 156 is a sensor lever 240 which extends generally perpendicular to arm 156a of the lever 156. The sensor lever 240 includes three segments, a radially curved portion 242 and a tangential portion 244 on one side of the radial portion 242 and an extending portion 246 on the other side of the radial portion 242. The sensor lever 240 can be made of thermoplastic, typically lubricated or conventional acetal. As will be seen from the description below, the extending portions 244 and 246 are used to place the retractor 22 in a pre-lock mode when the retractor is moved to extreme positions designated as 24b and 24c of FIG. 1b. With the vehicle sensor subassembly 150 and weight 154 in a vertical position, see FIG. 5c, (the weight being upright), the arm 156a (supported on the top 210 of the weight 154) extends outright from its connection with pin 194. In this condition the radial portion 240 lies along a radius extending perpendicular to a line extending through the axles 162a and 162b.

Figure 1C:
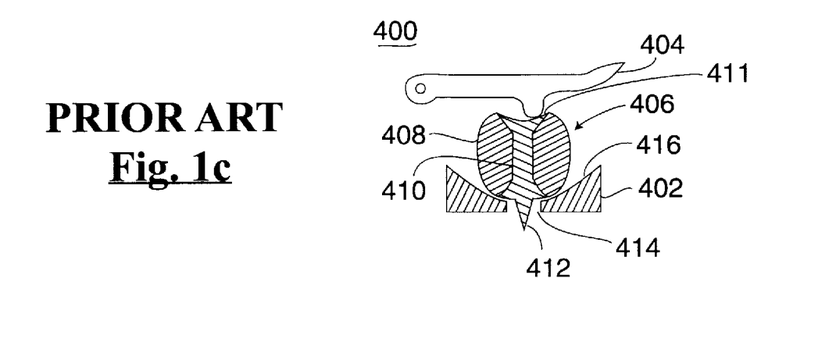
FIG. 1c shows a prior art vehicle sensor mass or weight.

In the preferred embodiment of the invention, the top 210 of the weight 154 is formed by an insertmolded elastomer having low friction characteristics such as a thermoset or thermoplastic elastomer. In general, the elastomer can be a rubberized plastic or a low-friction rubber. The weight or sensor mass 154, as is characteristic of a standing man inertial mass, includes a narrow base 260 and a larger and heavier upper body portion 262. This type of construction is typically unstable and prone to being tipped over. However, that is exactly the design intent of the standing man as part of vehicle seat belt sensor. The weight or sensor mass 154 includes a metal body 212 (see FIG. 5) having a central bore 214. The elastomeric material 216 is insert-molded to the metal body. The elastomeric material is formed into the conical top portion 210, a center portion 216 which extends through a body bore 217, and is molded to form an integral base 220 which covers the bottom 222 of the metal body. As can be appreciated, by utilizing the above-mentioned construction of the weight 154, any sound or rattling that might be occasioned by the weight 154 being vertically accelerated or bounced upon the platform 170 of the counterweight member 152 is significantly reduced as would be any vertical movement of the tip 204 of arm 156a on the top 210 of the weight. Further, any noise is further reduced by selecting the elastomer forming the top 210 to be softer than and dissimilar to the material forming the tip 202. Reference is briefly made to FIG. 1c which illustrates a prior art vehicle sensor 400 having a plastic housing 402 and an articulated, plastic pivot arm 404 which rests upon and is moved by a weight 406. The weight is formed by a spherically shaped metal body 408 having a central nylon insert 410. The nylon insert is relatively hard and forms the top 411 of the weight and is also formed into a conical projection 412 which extends into a drainage hole 414. The projection positions the weight centrally in the housing. The housing 402 additionally includes a spherically shaped basket 416 in which the weight 406 is received.

Figure 6:
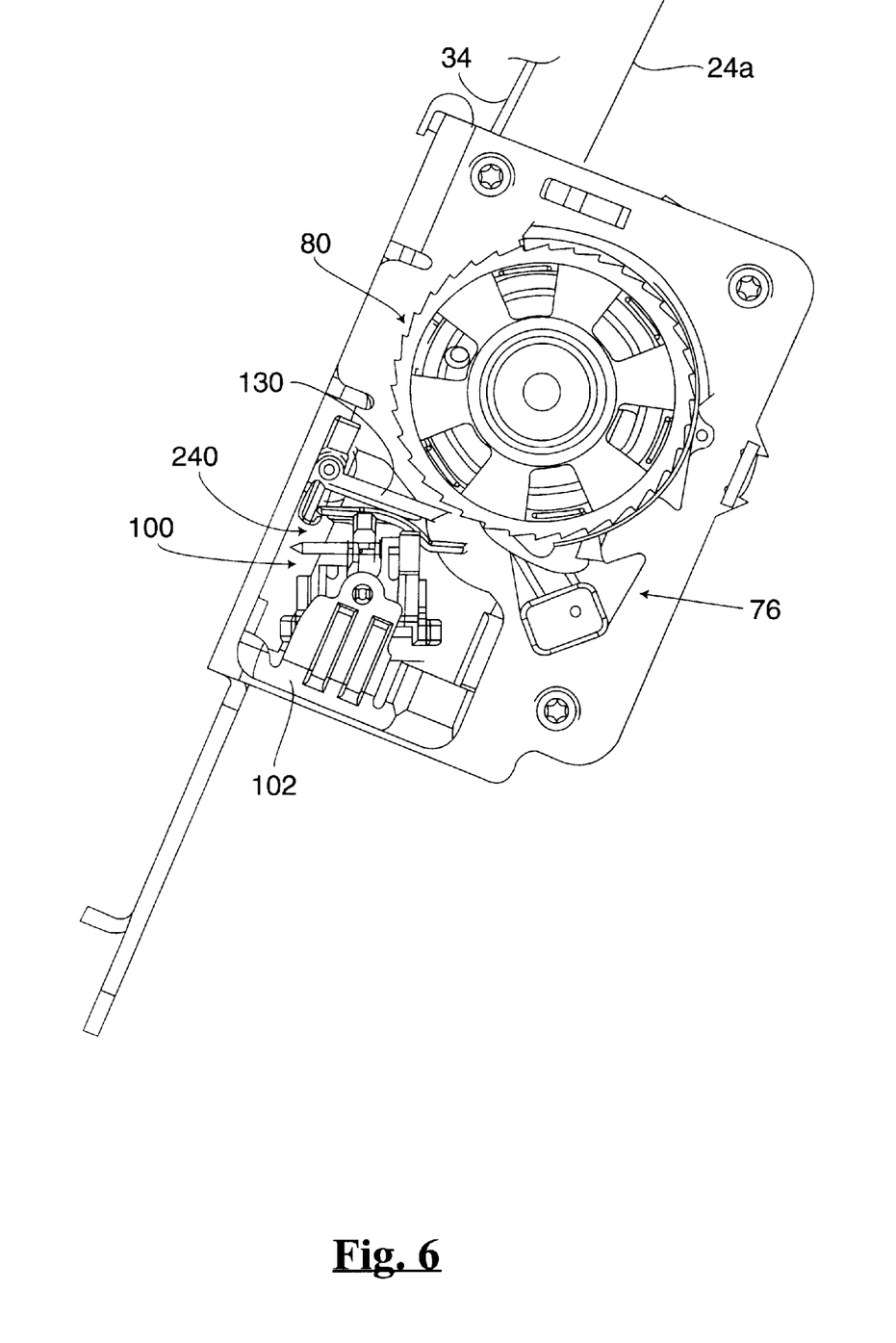
FIG. 6 shows the retractor and vehicle seat in a nominal condition and also shows the relative position of the components of the vehicle sensor.

Reference is briefly made to FIG. 6 which illustrates the orientation of the above-mentioned components with the seat back in its nominal position designated as 24a. In this nominal position the seat back and retractor are off-vertical. In this orientation the weight 154 is maintained in a general vertical position as the vehicle sensor subassembly 150 has been rotated about the pivots 162a, b. In this condition, if the vehicle is subject to a deceleration above a predetermined level about 0.45 to 0.7 g's, the mass 154 will begin to tip over relative to the platform and lift the sensor arm 240 which in turn raises the activation lever 130 and places the toothed portion 134 (of arm 130) into engagement with the tooth 80a of the ratchet wheel 80, causing the retractor to lock up as the lock ring 76 is moved while tension on the seat belt 34 (caused as the occupant loads the belt during an accident) causes the spool to rotate slightly.

Figure 7A:
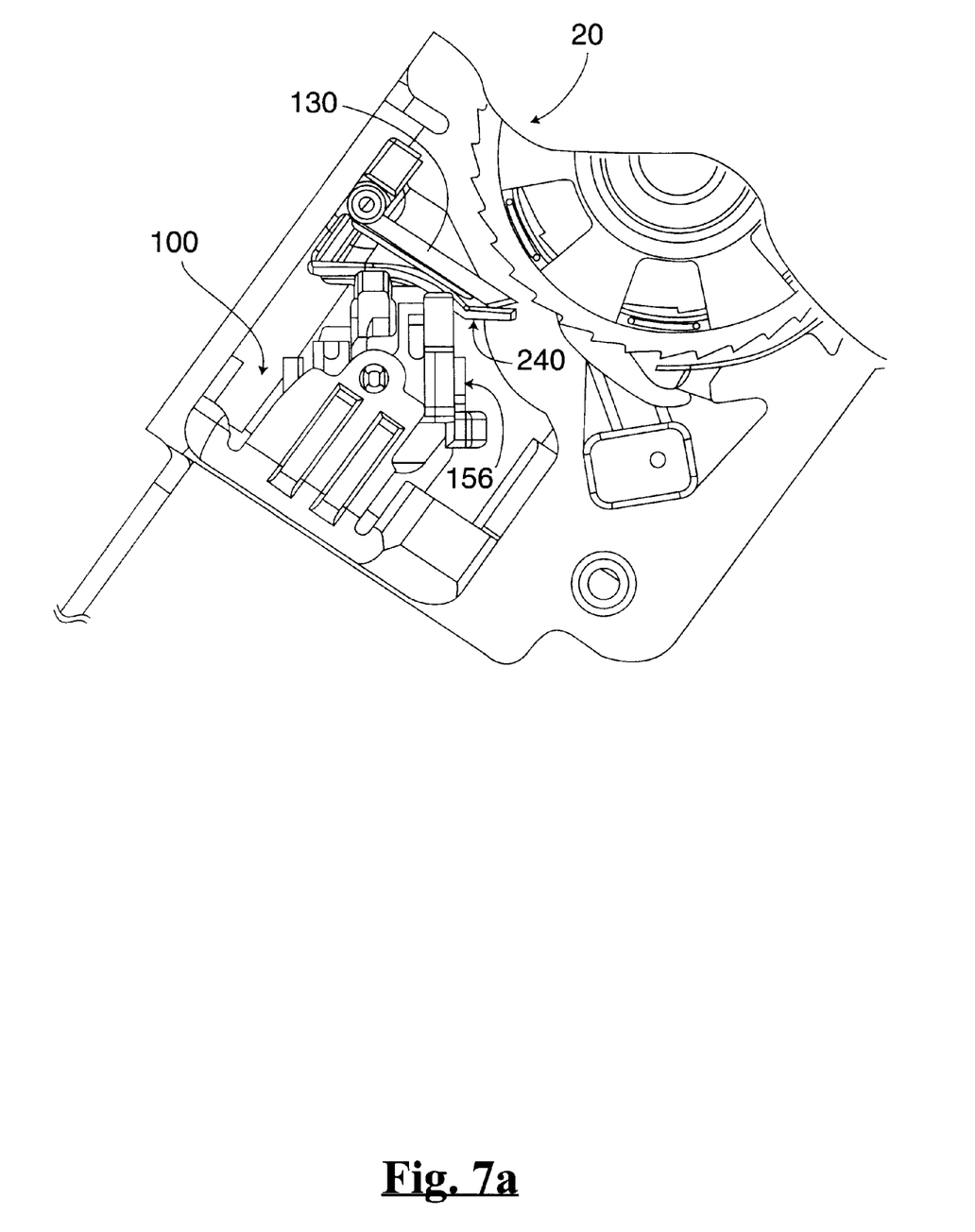
FIGS. 7a and 8a show the retractor and vehicle sensor in a condition that corresponds to seat back motion just short of the extreme range of the seat back.
Figure 8A:
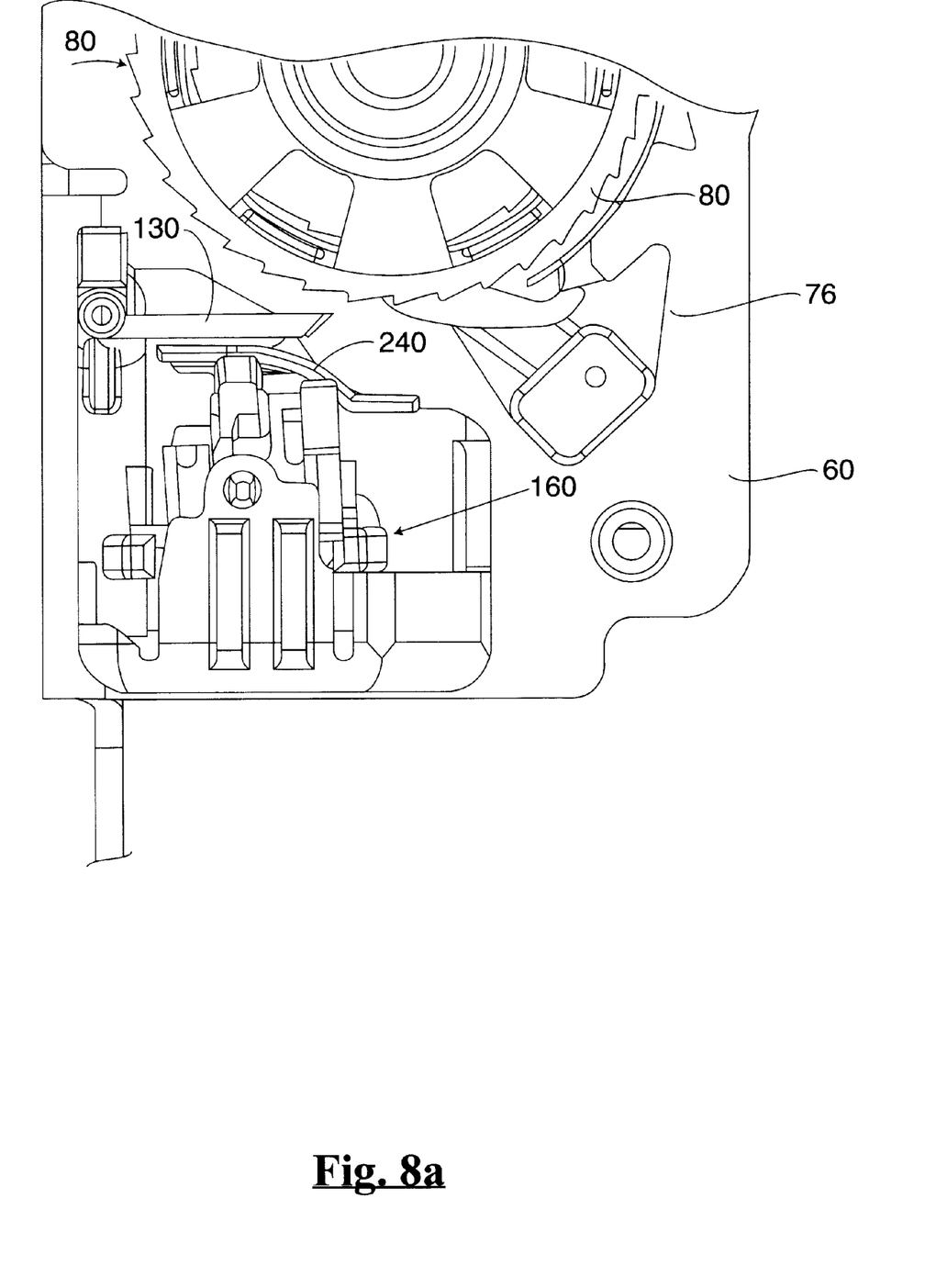

Reference is now briefly made to FIGS. 7a and 8a. FIG. 7a is a plan view showing the seat back 28 and retractor 20 moved rearward to a position that is just shy of the extreme positions shown by position 24b. As the seat back is being moved to this position, the counterweight member 160 of the sensor subassembly 150 rotates and is aligned to vertical. This rotation also causes the sensor arm 240 to slide under the activation arm 130. Since the arm 130 rides upon the radius portion 242 of the arm 240 the elevation of the activation arm will not move and remains in its unactivated position. The above is true as the seat is moved towards the vertical extreme of position 24c. As can be seen, the lower portion or rib 133 of the activating arm 130 has slid upon the arcuate portion 242 of sensor lever 240. Since this portion 242 is radially shaped, the elevation of the activating arm has not changed.

Figure 7B:
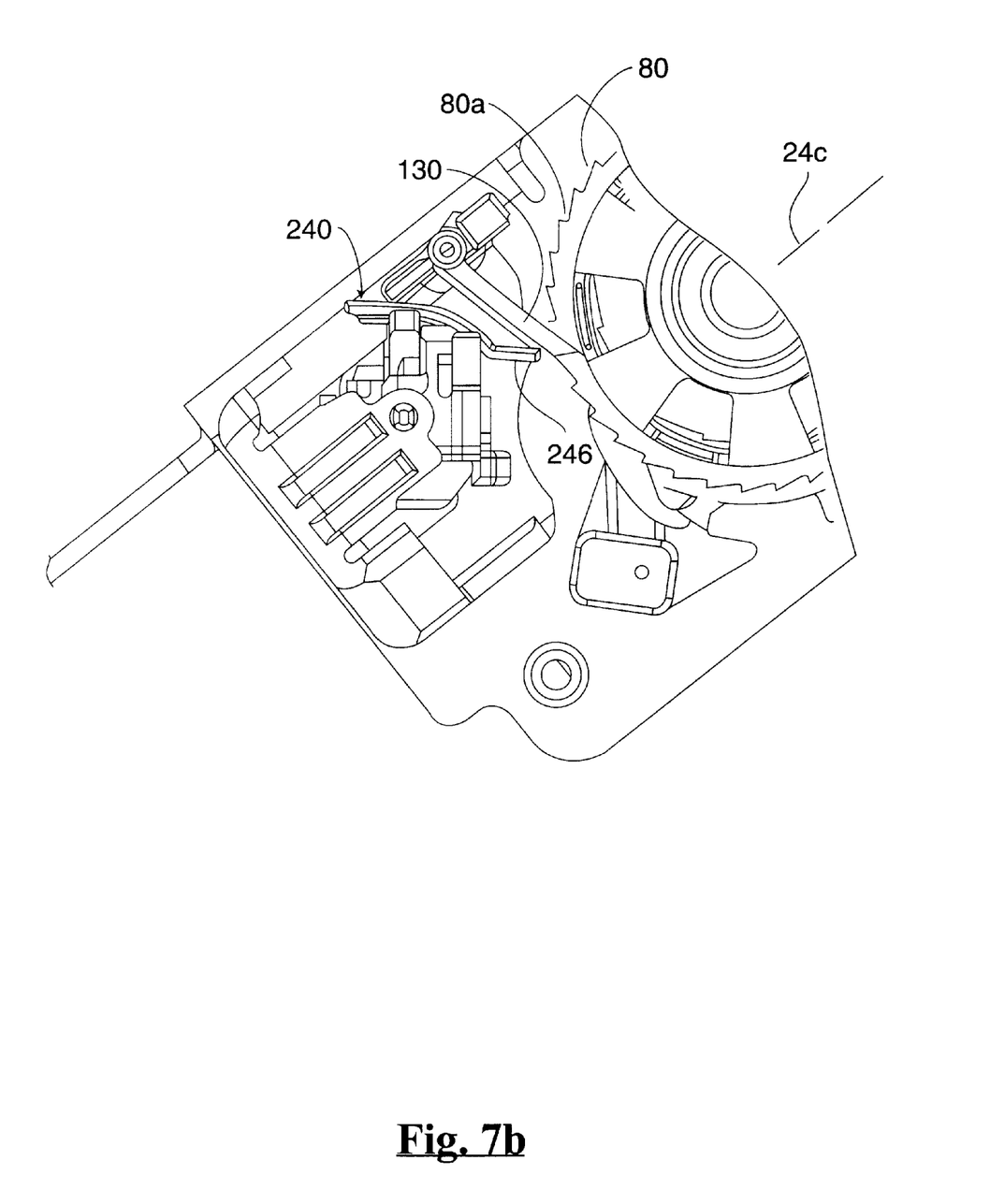
FIGS. 7b and 8b show the retractor and vehicle sensor in a condition that corresponds to the extreme range of seat back movement.
Figure 8B:
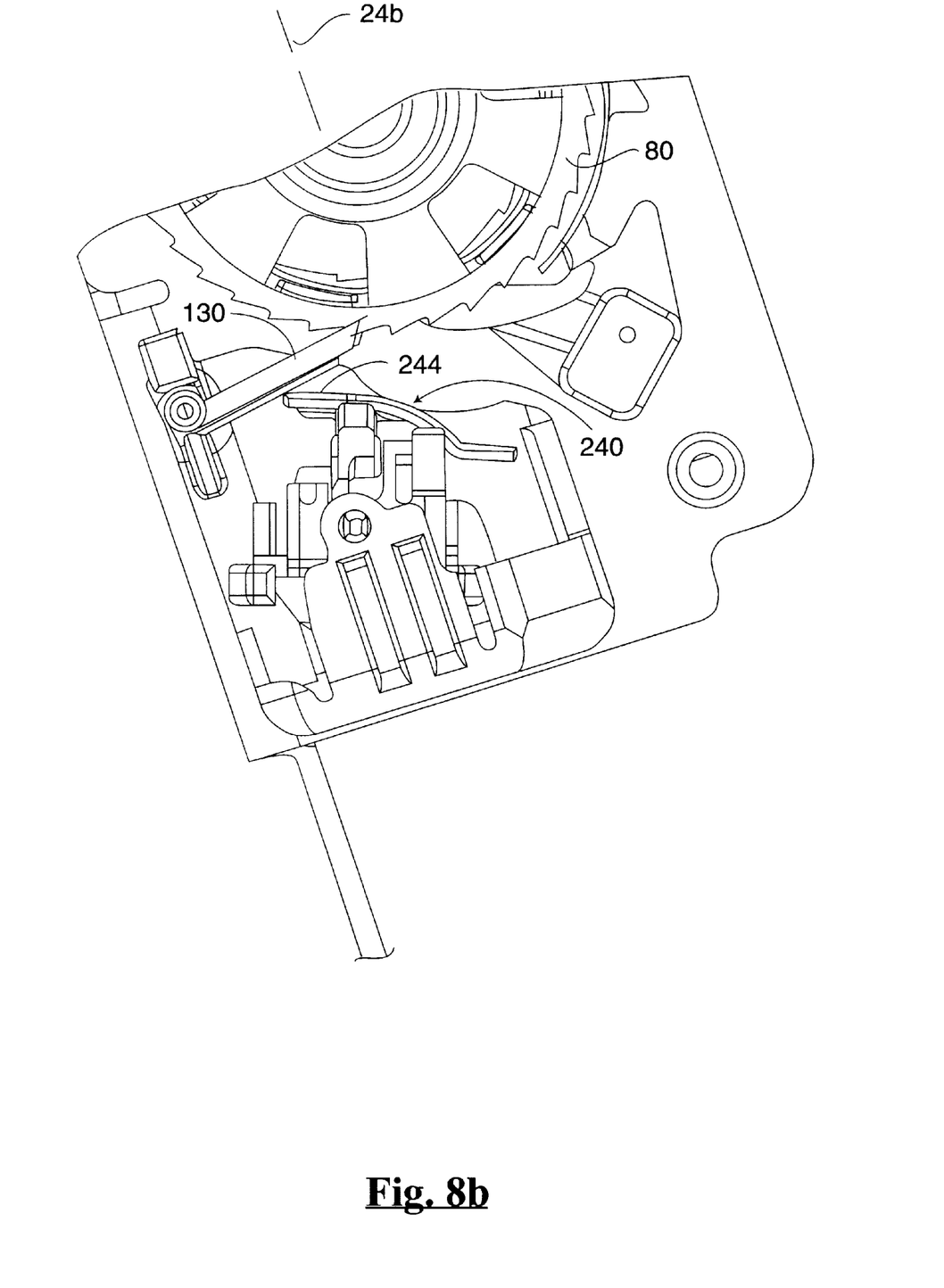

In FIG. 7b the seat back 28 is rotated further beyond to or beyond the zone limit such as 35 degrees from nominal. As before the weighted counterweight member 162, which maintains its orientation relative to gravity, and the extra rotation will cause the lower extension 246 to engage the arm 130 thereby raising the arm 130 into engagement with the teeth 80a of the ratchet wheel 80. This motion places the retractor in a pre-lock condition. Any protraction of the seat belt 34 will immediately place the retractor 20 in a locked condition. FIG. 8b, similar to FIG. 7b, which illustrates the seat in an almost vertical position generally in a forward pre-lock zone, whereupon the tangential, extending part 244 of the lever or pawl 240 has similarly engaged the pawl 130, raising its elevation into contacting engagement of the teeth 80a of ratchet wheel 80, thereby placing the retractor in another pre-lock condition.

Many changes and modifications in the above-described embodiment of the invention can, of course, be carried out without departing from the scope thereof. Accordingly, that scope is intended to be limited only by the scope of the appended claims.

What is claimed is:

1. A seat belt retractor (22) having an inertial sensor sensitive to deceleration, acceleration or rollover input above a certain level to initiate lockup of the retractor, the inertial sensor includes an inertial weight (154) having a body (212) with narrow base (260) and a larger, heavier upper portion (262), and an open top being filled with an elastomer (216) to reduce contact noise with a cooperating retractor part which rests upon the elastomer;

a bottom portion (222) of the narrow base being covered by a layer (220) of the elastomer (216) to prevent contact noise with a support upon which the weight is supported.

2. The device as defined in claim 1 wherein the body (212) includes a bore (217) extending therethrough and wherein the elastomer extends from the open top, through the bore and to the bottom of the narrow base.

3. The device as defined in claim 1 further including a movable activation arm (130), the arm residing in an inactive position with the weight in its nominal position and the arm being moved to an activated position in response to movement of the weight.

4. The device as defined in claim 3 wherein the inertial weight (154) is pivotally mounted upon a pendulum, the pendulum being rotationally mounted relative to a retractor frame, wherein the pendulum can align itself to the local gravity vector independent of the retractor being rotated to any one of a plurality of positions.

5. The device as defined in claim 4 wherein the retractor is adapted to be mounted within a movable seat back of a vehicle seat, wherein movement of the seat back to various positions causes the relative rotation of the retractor.

6. A seat belt retractor (22) having an inertial sensor sensitive to deceleration above a certain level to initiate lockup of the retractor, the inertial sensor including:

a first housing portion (102) having an actuating arm mounting member (120), the first housing portion (102) being adapted to be mounted to a side (60b) of the retractor, a first pin (126) cantilevered from the mounting member (120);

an activation arm (130) rotationally supported upon the first pin (126), the activation arm (130), when activated, movable into engagement with a ratchet wheel (80), a pendulous vehicle sensor subassembly (150) mounted upon the first housing portion (102), the subassembly (150) and the first housing portion (102) including means to rotatably support the sensor subassembly thereon;

the sensor subassembly (150) further including a weighted member (152) having a platform for supporting a movable inertial weight (154), the inertial weight movable on the platform in response to deceleration to which the retractor is subjected;

a movable arm (156) supported by the weighted member and including a sensing arm (240) having a tip (202) resting upon the inertial weight (154), the movable arm cantilever supported relative to the weighted member, wherein movement of the movable arm causes movement of the sensing arm thereby causing a change in the elevation of the activation arm thereby placing the retractor in a pre-lock mode.

7. The device as defined in claim 6 wherein the inertial weight includes a body (212) with narrow base and a larger, and heavier body portion (262), an open top being filled with an elastomer to reduce contact noise with a cooperating part design to rest upon the elastomer;

a bottom portion (222) of the narrow base being covered by a layer of the elastomer (222) to prevent contact noise with the platform upon which the weight is supported.

8. The device as defined in claim 7 wherein the body (216) includes a bore (217) extending therethrough and wherein the elastomer extends from the open top, through the bore and to the bottom of the narrow base.

9. The device as defined in claim 6 wherein the platform is pivotally mounted such that it can act as a pendulum and align itself to the local gravity vector when the retractor is rotated to any one of a plurality of positions.

10. The device as defined in claim 9 wherein the retractor is adapted to be mounted within a movable seat back of a vehicle seat, wherein movement of the seat back to various positions causes the relative rotation of the retractor.

11. The device as defined in claim 6 wherein the housing (102) is thermoplastic, the pin is covered from 0% to 100% by one of a thermoset and thermoplastic elastomeric material, the activation arm (130) is made from thermoplastic including acetal, the sensing arm (240) is made of a thermoplastic material, and wherein the weight member includes a metal body filled with one of a thermoset and thermoplastic elastomer which forms a top and bottom layer of the weight member.

* * * * *